US011883339B2

(12) United States Patent
Zhang

(10) Patent No.: US 11,883,339 B2
(45) Date of Patent: Jan. 30, 2024

(54) WHEELCHAIR STRUCTURE

(71) Applicant: GUANGZHOU SHIYUAN ELECTRONICS CO., LTD., Guangdong (CN)

(72) Inventor: Bolun Zhang, Guangdong (CN)

( * ) Notice: Subject to any disclaimer, the term of this patent is extended or adjusted under 35 U.S.C. 154(b) by 452 days.

(21) Appl. No.: 17/255,742

(22) PCT Filed: Nov. 2, 2018

(86) PCT No.: PCT/CN2018/113691
§ 371 (c)(1),
(2) Date: Dec. 23, 2020

(87) PCT Pub. No.: WO2020/000845
PCT Pub. Date: Jan. 2, 2020

(65) Prior Publication Data

US 2021/0267825 A1 Sep. 2, 2021

(30) Foreign Application Priority Data

Jun. 27, 2018 (CN) ......................... 201821005756.5

(51) Int. Cl.
*A61G 5/10* (2006.01)
*A61G 5/08* (2006.01)

(52) U.S. Cl.
CPC ............. *A61G 5/10* (2013.01); *A61G 5/0833* (2016.11)

(58) Field of Classification Search
CPC . A61G 5/10; A61G 5/14; A61G 5/128; A61G 5/0866; A61G 5/0833; B62B 1/002
See application file for complete search history.

(56) References Cited

U.S. PATENT DOCUMENTS 2,685,325 A * 8/1954 Webster ............... A61G 5/0833 297/30
4,025,088 A * 5/1977 Rothschild ............... A61G 5/08 280/649

(Continued)

FOREIGN PATENT DOCUMENTS

AT 513952 B1 * 6/2017
CN 102309382 A 1/2012

(Continued)

OTHER PUBLICATIONS

International Application No. PCT/CN2018/113691, International Search Report and Written Opinion dated Mar. 14, 2019, 11 pages.

*Primary Examiner* — Steve Clemmons

(57) ABSTRACT

A wheelchair structure includes a seat body, a rear wheel bracket, a push rod device, and two relatively arranged front wheel assemblies, where the front wheel assembly includes a support member and a first wheel body mounted at the bottom end of the support member, the seat body and the rear wheel bracket are rotatably connected between the support members of the two front wheel assemblies, the push rod device includes a push rod and a driving mechanism for driving the push rod to make a telescopic movement, a first end of the push rod is rotatably connected with the bottom of the seat body, a second end of the push rod is rotatably connected with the rear wheel bracket, the push rod makes the telescopic movement to drive the seat body to rotate between the support members of the two front wheel assemblies.

10 Claims, 5 Drawing Sheets

(56) References Cited

U.S. PATENT DOCUMENTS

| | | | | | |
|---|---|---|---|---|---|
| 4,809,804 | A * | 3/1989 | Houston | B60L 1/003 | 297/DIG. 10 |
| 5,290,049 | A * | 3/1994 | Crisp | B62B 9/102 | 280/30 |
| 5,683,096 | A * | 11/1997 | Zonka | B62B 7/08 | 280/62 |
| 7,077,416 | B2 * | 7/2006 | Duarte | A61G 5/14 | 297/DIG. 10 |
| 8,087,687 | B2 * | 1/2012 | Murdock | A61G 5/08 | 280/647 |
| 8,585,076 | B2 * | 11/2013 | Thorne | B62B 7/08 | 280/658 |
| 8,590,920 | B2 * | 11/2013 | Masaki | A61G 5/0825 | 297/337 |
| 9,060,909 | B1 * | 6/2015 | Gao | A61G 5/045 | |
| 9,339,431 | B2 * | 5/2016 | Menard | B62K 11/007 | |
| 11,337,874 | B2 * | 5/2022 | Sjogren | A61G 5/104 | |
| 2015/0272798 | A1 | 10/2015 | Hsieh et al. | | |

FOREIGN PATENT DOCUMENTS

| | | | | |
|---|---|---|---|---|
| CN | 104706480 | A | 6/2015 | |
| CN | 105125356 | A | 12/2015 | |
| CN | 107088124 | A * | 8/2017 | |
| DE | 102011011885 | A1 * | 8/2012 | A61G 5/10 |
| DE | 102019001625 | A1 * | 9/2020 | |
| EP | 2146888 | B1 * | 8/2011 | B62B 7/06 |
| EP | 3072489 | A1 * | 9/2016 | A61G 5/1056 |
| ES | 2332486 | B1 * | 1/2011 | B62B 7/062 |
| FR | 2490955 | A1 * | 4/1982 | |
| FR | 2712802 | A1 * | 6/1995 | A61G 5/14 |
| FR | 2856281 | A1 * | 12/2004 | A61G 5/14 |
| KR | 20140109721 | A * | 9/2014 | |
| KR | 20140110402 | A * | 9/2014 | |
| NL | 1008418 | C2 * | 8/1999 | A61G 5/1078 |
| WO | WO-9204559 | A1 * | 3/1992 | |
| WO | 9629969 | A1 | 10/1996 | |

* cited by examiner

WHEELCHAIR STRUCTURE

CROSS-REFERENCE TO RELATED APPLICATIONS

This application is a national stage of PCT/CN2018/113691 filed Nov. 2, 2018, which claims priority benefit to Chinese application CN 201821005756.6 filed Jun. 27, 2018. The contents of the above-identified applications are hereby incorporated by reference in their entireties.

TECHNICAL FIELD

The present disclosure relates to a wheelchair structure.

BACKGROUND

Wheelchairs are an important tool used by people with limited mobility in their daily lives, and are usually used as a transportation means for these people to participate in more social activities. The current wheelchairs are rich in features and have the function of assisting the elders to stand up from the wheelchairs. However, the current wheelchairs with this function have very complicated structure and design and are relatively inconvenient for use. These wheelchairs usually are bulky in size, and are difficult to fold, thus resulting in inconvenience in storage and transportation when going out.

SUMMARY OF THE DISCLOSURE

Based on the above-identified deficiencies of the current technologies, an embodiment of the present disclosure provides a wheelchair structure that can realize the function of assisting the senior person to stand up, so that the senior person can use the wheelchair more easily and safely. Further, the wheelchair has a simple structural design, which is convenient to be folded.

Based on this, the technical solution of the present disclosure is: a wheelchair structure, comprising a seat body, a rear wheel bracket, a push rod device, and two relatively-arranged front wheel assemblies, wherein each of the front wheel assemblies includes a support member and a first wheel body mounted at the bottom end of the support member, the seat body and the rear wheel bracket are rotatably connected between the support members of the two front wheel assemblies, the push rod device includes a push rod and a driving mechanism for driving the push rod to make a telescopic movement, a first end of the push rod is rotatably connected to the bottom of the seat body, a second end of the push rod is rotatably connected with the rear wheel bracket, the push rod makes the telescopic movement to drive the seat body to rotate between the support members of the two front wheel assemblies so as to prop up or fall back the seat body, a control switch is provided in the upper part of the support member, and the control switch is electrically connected with the driving mechanism.

Optionally, the support member is a support plate, an armrest of the wheelchair structure is formed in the upper part of the support plate, a through hole for fingers to pass through is provided in the armrest, and the control switch is arranged in the through hole.

Optionally, the wheelchair structure further includes a handle, where the control switch is provided on the handle, the handle is rotatably connected to the front side of the through hole, and gripping the handle and lifting the handle upward can activate the drive mechanism to extend or contract the push rod device.

Optionally, a clamping slot is provided at the bottom end of the support plate, and the first wheel body is embedded in the clamping slot.

Optionally, the seat body includes a sitting portion, a limiting groove is provided at the bottom of the sitting portion, the rear wheel bracket includes a bracket and a first connecting member, the bottom end of the first connecting member is fixedly connected with the bracket, the top end of the first connecting member is connected between the two front wheel assemblies, and when the wheelchair structure is in an unfolded state, the top end of the first connecting member is located in the limiting groove.

Optionally, the sitting portion is rotatably connected between the support members of the two front wheel assemblies through a first connecting shaft, the first end of the push rod is rotatably connected to the bottom of the seat body at a position on the rear side of the first connecting shaft, and the second end of the push rod is rotatably connected with the first connecting member.

Optionally, two connect receptors are provided in the limiting groove, relatively-arranged positioning holes are respectively provided on the two connect receptors, a second connecting shaft is rotatably connected to the positioning holes of the two connect receptors, and the first end of the push rod is vertically connected with the second connecting shaft.

Optionally, a connecting groove with an opening at the front side is provided on the first connecting member, a third connecting shaft is rotatably connected between two side walls of the connecting groove, the second end of the push rod is vertically connected with the third connecting shaft, the upper portions of the two side walls of the connecting groove are rotatably connected with their relative support members respectively, and an end of the connecting groove is fixedly connected with the rear wheel bracket.

Optionally, the upper ends of the two side walls of the connecting groove are respectively connected with connecting plates arranged relatively with respect to the supporting members, a fourth connecting shaft is rotatably connected between the connecting plates and the supporting members arranged relatively with respect to the connecting plates, and when the wheelchair structure is in the unfolded state, the connecting plates are perpendicular to the sitting portion.

Optionally, the rear wheel bracket includes a second connecting member and second wheel bodies rotatably connected to two ends of the second connecting member, and the bottom end of the first connecting member is vertically connected with the second connecting member.

Implementing the embodiments of the present disclosure has the following beneficial effects:

The wheelchair of the present disclosure includes a push rod device, a seat body, a rear wheel bracket, and two relatively-arranged front wheel assemblies, wherein the front wheel assembly includes a support member and a first wheel body mounted at the bottom end of the support member, the seat body and the rear wheel bracket are rotatably connected between the support members of the two front wheel assemblies respectively, the push rod device includes a push rod and a driving mechanism for driving the push rod to make a telescopic movement, and both ends of the push rod are rotatably connected with the front wheel assemblies and the rear wheel device, respectively. When the push rod makes an extension or contraction movement, the seat body can be driven to rotate so as to prop up or fall back.

When the senior person sitting in a wheelchair needs to stand up, the driving mechanism is activated by the control switch to control the push rod to extend so as to prop up the seat body, so that the buttocks of the senior person can be raised to step down with ease from the wheelchair. When the senior person in a standing state needs to sit down, first the push rod state is adjusted through the control switch to drive the seat body to raise and contact with the buttocks, and then the seat body is lowered back slowly through the control switch, thereby bringing the buttocks to gradually lower, and assisting the senior person to sit down. The whole process is simple and reliable, and the operation is easy. Therefore, it is possible to help the senior person use the wheelchair easily and safely and save his or her labor. In addition, the telescopic movement of the push rod can also drive the seat body and the rear wheel bracket to rotate so as to achieve the folding or unfolding of the wheelchair. Therefore, the folding or unfolding of the wheelchair can also be achieved by the extension or contraction of the push rod itself, and the whole folding process is very simple, and the operation is convenient, which saves more labor, and it also is possible to be used independently by older patients or the disabled. The overall design of the wheelchair structure is simplified, which not only can assist the senior person to stand up, but also can be easily folded. And it is easy to be stored and organized.

Furthermore, when the wheelchair is folded, the seat body and the rear wheel bracket of the wheelchair can be completely retracted between the two support members. The second wheel body and the first wheel body are folded overlapping with each other, and the volume of the entire wheelchair after being folded is very small, so that it is very convenient to be stored. The entire wheelchair structure has very few exposed mechanisms, and the appearance is compact and aesthetic. Moreover, the user can use the first wheel body and the second wheel body of the wheelchair to move the wheelchair by using the armrest in the upper part of the support member as a push hand, which facilitates transportation and transfer.

REFERENCE TO THE NUMERALS

1. push rod; 2. seat body; 21. sitting portion; 211. first limiting groove; 212. second limiting groove; 22. leaning portion; 3. rear wheel bracket; 31. first connecting member; 311. connecting groove; 312. connecting plate; 32. rear wheel assembly; 321. second connecting member; 322. second wheel body; 4. front wheel assembly; 41. support member; 411. armrest; 412. through hole; 413. clamping slot; 42. first wheel body; 5. first connecting shaft; 6. connecting seat; 61. positioning hole; 7. second connecting shaft; 8. third connecting shaft; 9. fourth connecting shaft; 10. handle; 11. pedal mechanism; 111. first support plate; 112. second support plate; 113. third connecting member; 114. Fifth connecting shaft.

DESCRIPTION OF THE PREFERRED EMBODIMENTS

Hereinafter, the technical solutions in the embodiments of the present disclosure will be clearly and completely described in conjunction with the accompanying drawings in the embodiments of the present disclosure. Obviously, the described embodiments are only a part of embodiments of the present disclosure, not all embodiments. Based on the embodiments of the present disclosure, all other embodiments obtained by those skilled in the art without creative work shall fall within the claimed scope of the present disclosure.

In the description of the present disclosure, it should be understood that the orientation or the positional relationship indicated by the terms “upper”, “lower”, “left”, “right”, “top”, “bottom”, “front”, “rear”, etc. is the orientation or positional relationship shown based on the drawings, and is only for the convenience of describing the present disclosure and simplifying the description, and does not indicate or imply that the device or element referred to must have a specific orientation, be constructed and operated in a specific orientation, therefore, they cannot be understood as a limitation of the present disclosure.

Figure 1:
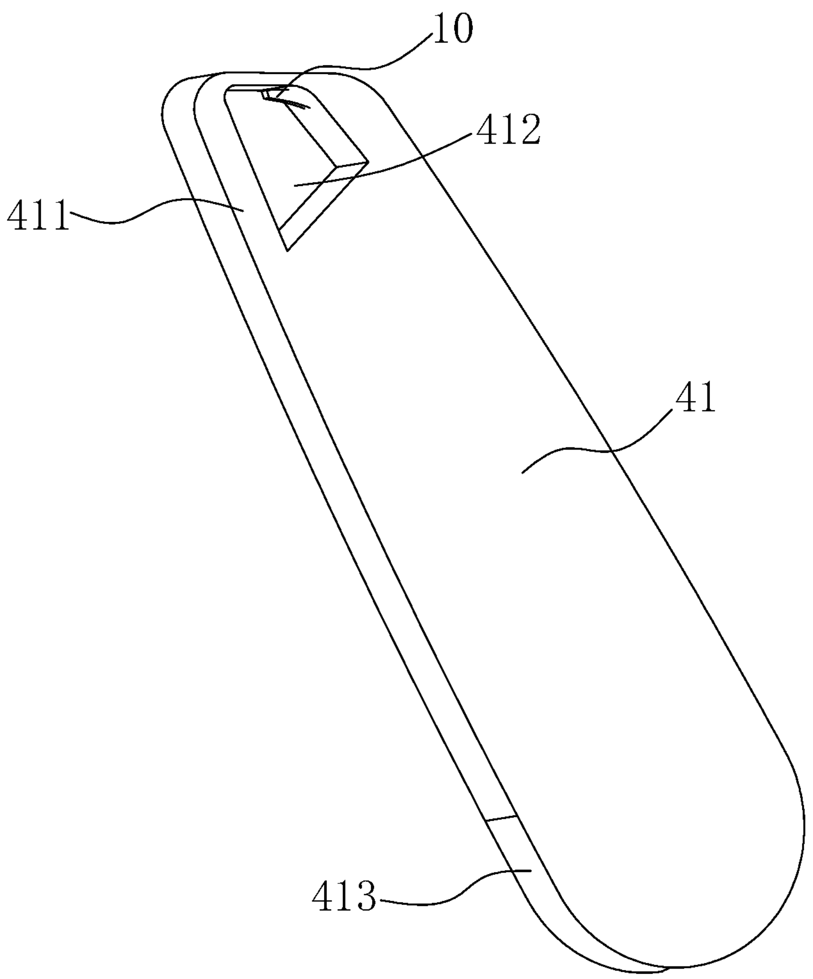
FIG. 1 is a schematic structure diagram of a support member of a wheelchair structure according to an embodiment of the present disclosure.
Figure 2:
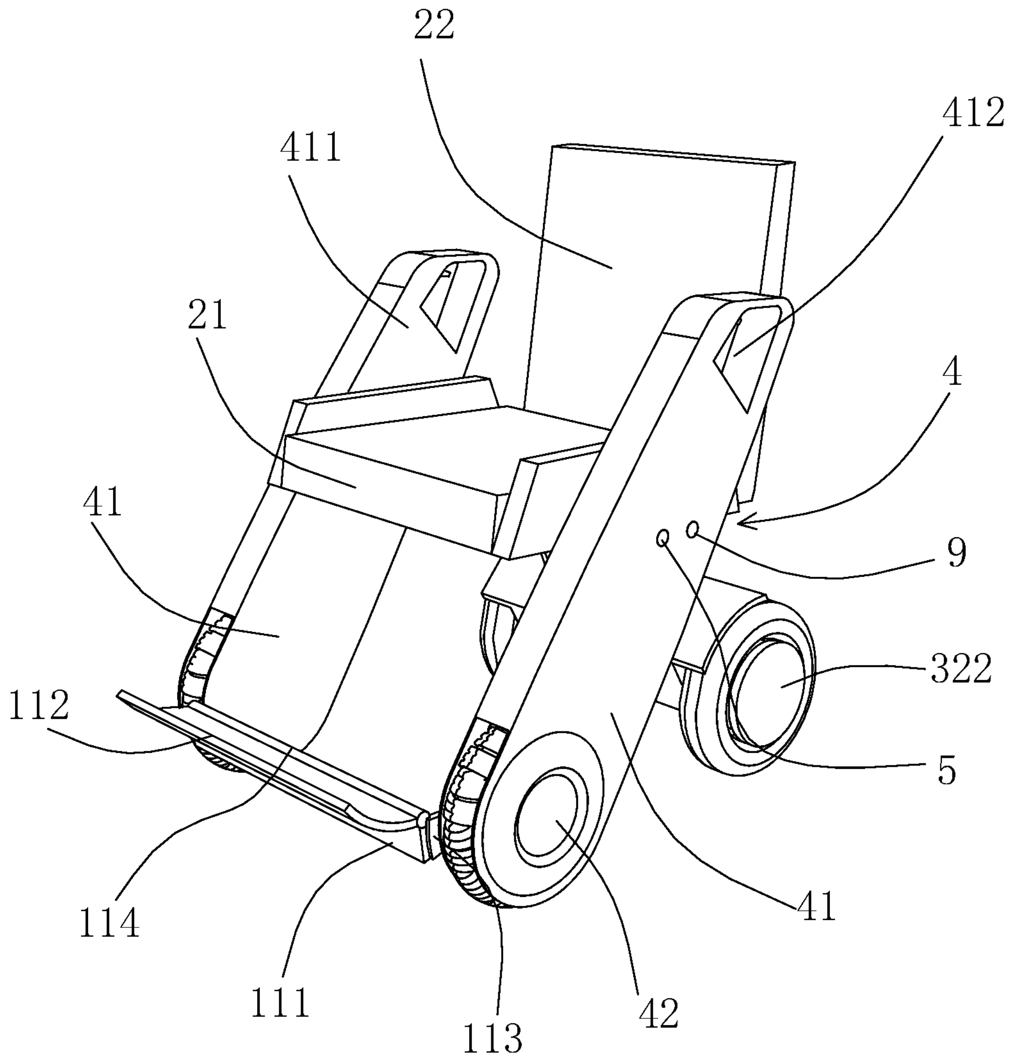
FIG. 2 is a front view of a schematic structure of the wheelchair structure when being unfolded according to the embodiment of the present disclosure.
Figure 3:
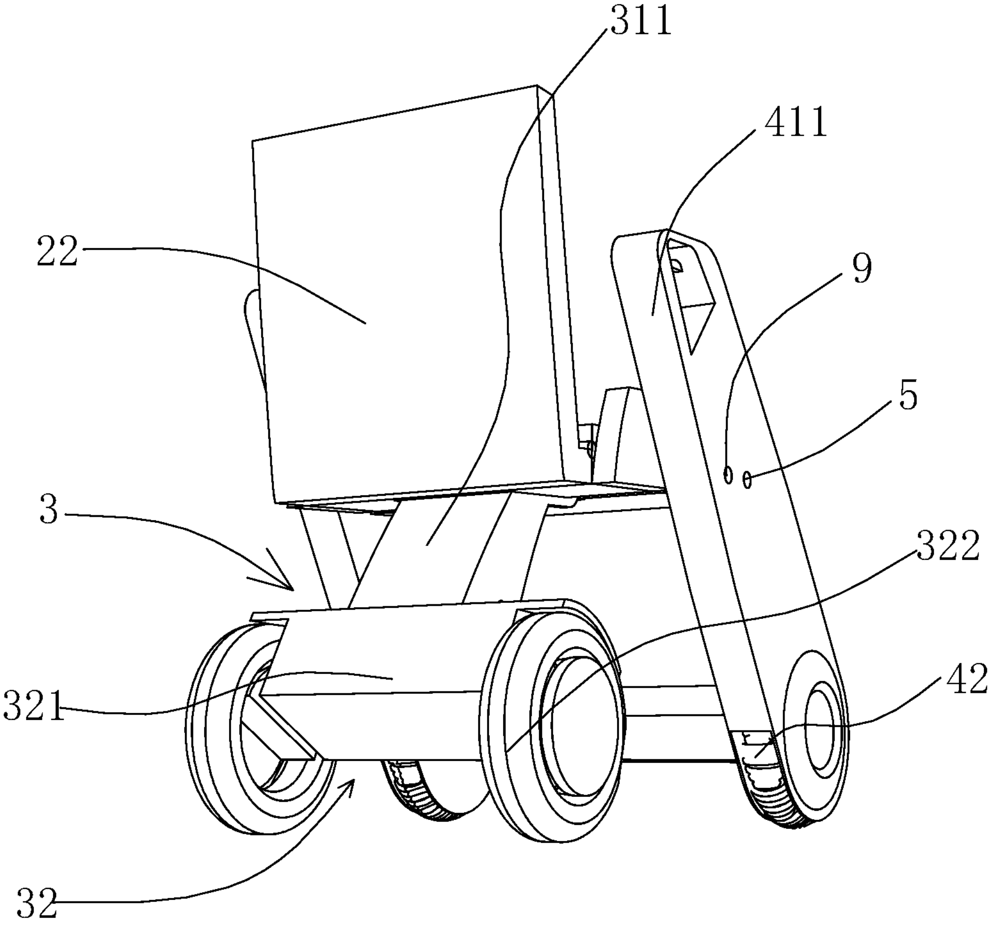
FIG. 3 is a back view of the schematic structure of the wheelchair structure when being unfolded according to the embodiment of the present disclosure.
Figure 4:
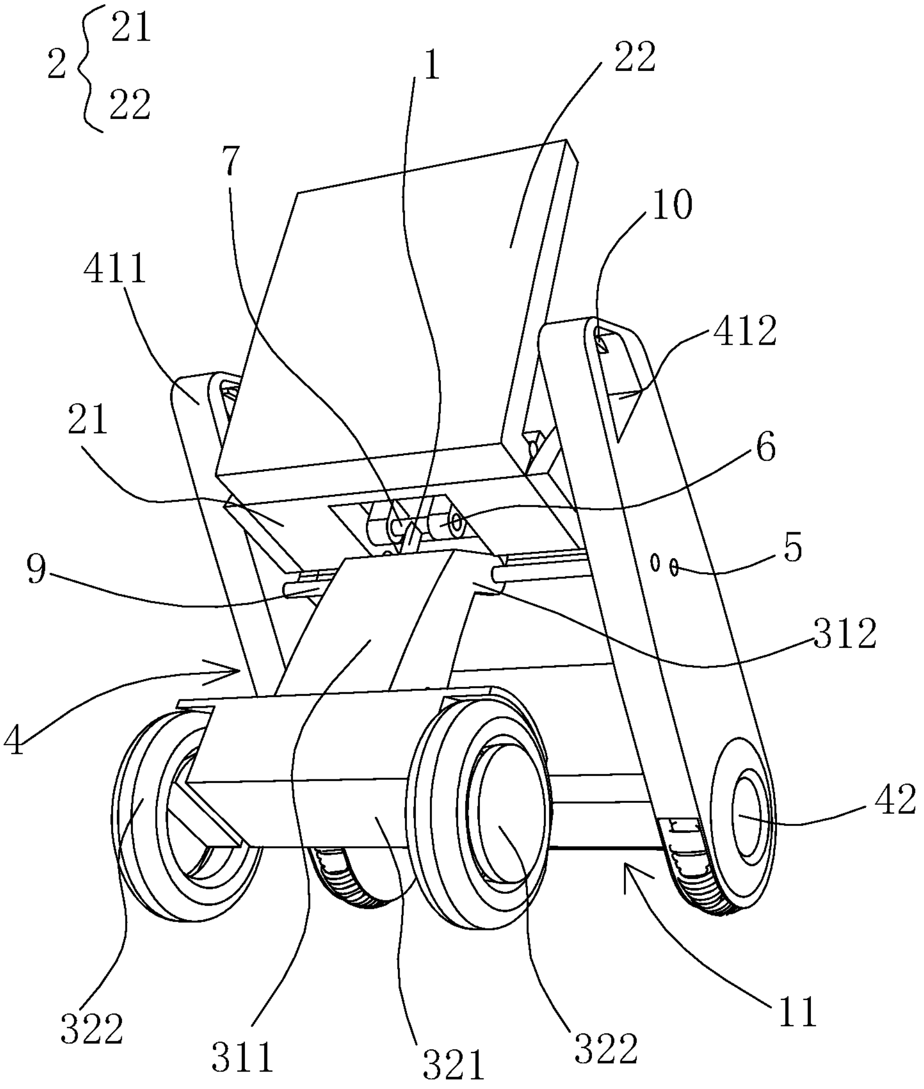
FIG. 4 is a schematic structure diagram of the wheelchair structure in the folding process according to the embodiment of the present disclosure.
Figure 5:
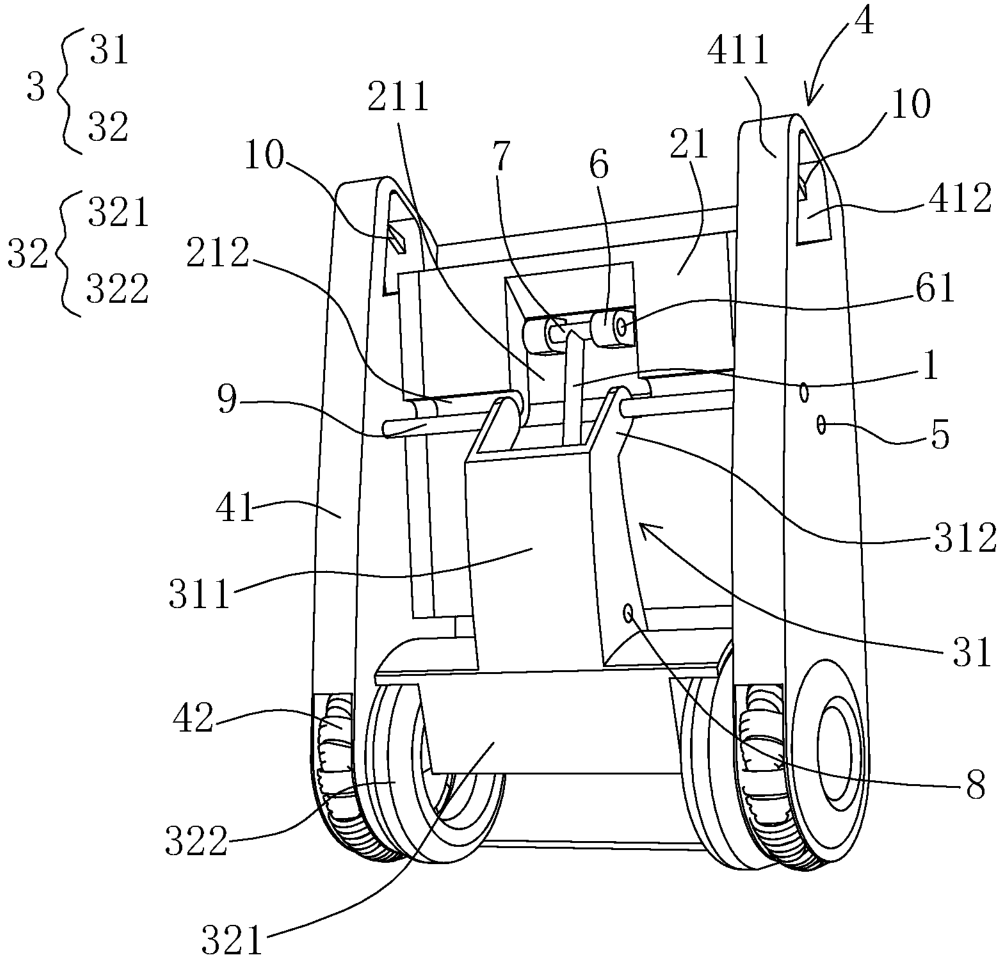
FIG. 5 is a schematic structure diagram of the wheelchair structure after being folded according to the embodiment of the present disclosure.

Referring to FIGS. 1 to 5, this embodiment provides a wheelchair structure, including a seat body 2, a rear wheel bracket 3, a push rod device 1, and two relatively-arranged front wheel assemblies 4. The front wheel assembly 4 includes a support member 41 and a first wheel body 42 mounted at the bottom end of the support member 41. The seat body 2 and the rear wheel bracket 3 are rotatably connected between the support members 41 of the two front wheel assemblies 4. The push rod device includes a push rod 1 and a driving mechanism for driving the push rod 1 to make a telescopic movement. A first end of the push rod 1 is rotatably connected to the bottom of the seat body 2, and a second end of the push rod 1 is rotatably connected with the rear wheel bracket 3. The push rod 1 makes the telescopic movement to drive the seat body 2 to rotate between the support members 41 of the two front wheel assemblies 4, so as to realize the propping up or falling back of the seat body 2. A control switch is provided in the upper part of the support member 41, and the control switch is electrically connected with the driving mechanism.

Based on the above structure, when the senior person sitting on the wheelchair structure need to stand up while, the drive mechanism is activated by the control switch on the support member 41 to drive the push rod to make the telescopic movement. When the push rod 1 is extended, the seat body 2 is propped up to raise the buttocks of the senior person, so that the senior person can directly walk away the wheelchair structure on their feet so as to realize the stand-up from the wheelchair. After the senior person stands up and walks away the wheelchair, the push rod 1 can be adjusted by the control switch to continue extending to the longest state, thereby driving the seat body 2 and the rear wheel bracket 3 to make a relative movement between the support members 41 of the two front wheel assemblies 4, and both move closer to the two support members 41. At this moment, the seat body 2 is turned down until the seat is completely erected, and the rear wheel assembly 32 rotates forward until overlapping with the front wheel assembly 4, thereby completely folding the wheelchair. When needing to sit down in a standing state, the senior person only needs to move the folded wheelchair structure behind the body and make the buttocks contact with the seat body 2. At this time, by adjusting the push rod 1 with the control switch to make a contraction movement, the wheelchair structure is expanded gradually; the seat body 2 is slowly lowered; the buttocks of the senior person are gradually lowered with the seat body 2, finally assisting the senior person to sit down. When the push rod 1 is contracted to the shortest state, the seat body 2 is completely opened and returned to a normal use state. The extension and contraction of the push rod 1 are maintained in one direction. When the seat body 2 and the rear wheel assembly 32 are retracted or unfolded, the seat body 2 and the rear wheel assembly 32 both rotate between the two front wheel assemblies 4 and respectively rotate relative to the respective ends of the push rod 1. The rotation movement can make the whole folding operation smoother, and make the user save more labor during the entire operation process. The entire process is very simple because using the push rod 1 to rotate the seat body 2 can save the senior person's labor when getting on and getting off the wheelchair, and the telescopic movement of the push rod 1 is very stable, which can prevent the seat body 2 from rotating suddenly and causing danger to the senior person. In addition, the wheelchair structure is convenient to be folded, which is convenient for older patients or the disabled to use independently. After being folded, both the seat body 2 and the rear wheel assembly 32 are located between the two front wheel assemblies 4, the overall volume is very small, and the occupied space is relatively small, which is convenient for storage and placement. The design of the wheelchair structure is simplified, and the appearance is compact and aesthetic.

Further, the support member 41 can be a support plate, where an armrest 411 of the wheelchair structure is provided in an upper part of the support plate, a through hole 412 for fingers to pass through is provided to the armrest 411, and the control switch is arranged in the through hole 412. The structural design of the entire front wheel assembly 4 is simplified. When adjusting the wheelchair, the senior person only needs to pass the fingers through the through hole 412 to adjust the control switch arranged in the armrest 411. The operation process is very convenient. The wheelchair structure further includes a handle 10. The control switch is provided on the handle 10, and the handle 10 is rotatably connected to the front side of the through hole 412. Gripping the handle 10 and lifting the handle 10 upward can activate the drive mechanism to drive the push rod 1 to extend or contract. When the senior person needs to stand up or sit down, the left and right hands hold the two handles 10 in the armrests 411 at the same time to adjust the state of the wheelchair to assist their actions. At this time, the senior person's hands holding the armrests 411 at the same time can provide certain support to the senior person themselves, so as to facilitate sitting down or standing up more safely for them. It should be noted that, in this embodiment, the push rod device uses an electric push rod, and the user directly controls the telescopic movement of the electric push rod by adjusting the on and off of the control switch on the handle 10, thereby very conveniently completing the automatic folding of the wheelchair. An installation position is provided at the front side of the inner walls of the through hole 412, and the first end of the handle 10 is inserted into the installation position. The handle 10 can be rotated upwards relative to the first end. When the user needs to fold the wheelchair, it only needs to pass the hand into the through hole 412, hold the handle 10 located inside the through hole 412, and lift the handle 10 upward, and then the electric push rod can be activated for extension or contraction. However, the selection of the type of the push rod device is not limited by this embodiment, and other devices such as a pneumatic push rod can also be selected according to actual needs.

Furthermore, the seat body 2 includes a sitting portion 21 and a leaning portion 22. The sitting portion 21 is rotatably connected between the two front wheel assemblies 4, and the first end of the push rod 1 is rotatably connected to the bottom of the sitting portion 21. The seat body 2 is propped up and fallen back by pushing and pulling the sitting portion 21 by the push rod device 1. The leaning portion 22 is rotatably connected with the sitting portion 21, and in the normal use state, the leaning portion 22 is vertically connected to the rear side of the sitting portion 21, and also, the leaning portion 22 can continuously provide support for the senior person when the senior person is standing, thereby ensuring the safety of the senior person. When the push rod device 1 pushes the sitting portion 21 to turn down until being completely erected for folding and storage, the leaning part 22 can be further turned down until overlapping with the sitting portion 21, thereby achieving the complete folding of the seat body 2, so that the seat body 2 is located between the two front wheel assemblies 4 and the occupied space is reduced. The bottom of the sitting portion 21 is provided with a first limiting groove 211. The rear wheel bracket 3 includes a rear wheel assembly 32 and a first connecting member 31. The bottom end of the first connecting member 31 is fixedly connected with the rear wheel assembly 32. The top end of the first connecting member 31 is rotatably connected with the support members 41 of the two front wheel assemblies 4. And when the wheelchair structure is in an unfolded state, the top end of the first connecting member 31 is located in the first limiting groove 211, so that the first connecting member 31 of the rear wheel bracket 3 not only can rotatably connect the rear wheel assembly 32 between the support members 41 of the two front wheel assemblies 4, but also can reliably and effectively support the sitting portion 21 when the wheelchair is unfolded, so that the entire wheelchair is more stable during use. The sitting portion 21 is rotatably connected between the support members 41 of the two front wheel assemblies 4 through a first connecting shaft 5. The support members 41 can support the sitting portion 21 on both sides, and the first connecting shaft 5 passes through in turn the support member 41 on the left side, the sitting portion 21, and the support member 41 on the right side, so that the rotation of the sitting portion 21 is very reliable. After being folded, the sitting portion 21 is located between the support members 41 on both sides, and both sides thereof are parallel to the support members 41. The first end of the push rod 1 is rotatably connected to the bottom of the seat 21, and the first end of the push rod 1 is located on the rear side of the connection between the sitting portion 21 and the two front wheel assemblies 4, so as to ensure that when the push rod 1 is extended or contracted, the movement of pushing the sitting portion 21 to rotate relatively with respect to the two supporting members 41 is more reliable. Two connecting seats 6 are provided in the first limiting groove 211 at the bottom of the sitting portion 21. Positioning holes 61 arranged relatively are respectively provided on the two connecting seats 6. A second connecting shaft 7 rotatably connects the positioning holes 61. The first end of the push rod 1 is vertically connected with the second connecting shaft 7, which is more convenient for the push rod 1 to drive the sitting portion 21. The arrangement of the connecting seats 6 can ensure the rotation of the second connecting shaft 7 more reliable. It should be noted that in this embodiment, the support member 41 is a support plate, a clamping slot 413 is provided at the bottom end of the support member 41, the first wheel body 42 is rotatably embedded in the clamping slot 413, and a through hole 412 for fingers to pass through is provided in the upper part of the support member 41, so that the top of the support member 41 forms the armrest 411 for the user to place the arm. When the wheelchair is folded as a whole, the user can push the first wheel body 42 through the armrest 411 for rotation, so that the wheelchair can be transported and transferred, which is convenient and labor-saving. The structural design of the front wheel assembly 4 is very concise, making the overall appearance of the wheelchair more aesthetic.

In addition, the second end of the push rod 1 is rotatably connected to the bottom end of the first connecting member 31, and the extension or contraction of the push rod 1 drives the top end of the first connecting member 31 to rotate between the two support members 41. Furthermore, the first connecting member 31 drives the rear wheel assembly 32 to approach or move away from the front wheel assembly 4, thereby achieving folding or unfolding of the rear wheel assembly 32. The first connecting member 31 is provided with a connecting groove 311 with an opening toward the front side. The lower end of the connecting member 31 is fixedly connected with the rear wheel assembly 32, a third connecting shaft 8 is arranged between the two side walls of the connecting groove 311, and the second end of the push rod 1 is vertically connected with the third connecting shaft 8. When the wheelchair is in the unfolded state, the push rod 1 is entirely located in the connecting groove 311, and the third connecting shaft 8 drives the rear wheel assembly 32 to rotate relative to the push rod 1, so as to ensure the reliability of the folding of the rear wheel assembly 32. The upper end of the connecting groove 311 is rotatably connected between the support members 41 of the two front wheel assemblies 4, and two side edges of the upper end of the connecting groove 311 are respectively connected with the support plates 312 arranged relative to the support members 41. A fourth connecting shaft 9 rotatably inserted between the support plates 312 and the support members 41 relatively arranged with respect to the support plates 312. The arrangement of the connecting plate 312 can ensure that the connecting groove 311 can rotate more smoothly between the two supporting members 41 through the fourth connecting shaft 9 and it is also more convenient to drive the connecting groove 311 to rotate. When the wheelchair is in the unfolded state, the connecting plate 312 and the sitting portion 21 are perpendicular to each other, and the sitting portion 21 can be reliably supported. The groove opening of the connecting groove 311 faces the front side, and the groove bottom faces the rear side. Therefore, when the wheelchair is completely unfolded and the push rod 1 is in a contraction state, the push rod 1 can be completely situated in the connecting groove 311, the connecting plate 312 is completely submerged in the first limiting groove 211, and the connecting groove 311 and the first limiting groove 211 cooperate with each other to cover the push rod 1 and the connection relationship therebetween, so that the exposed mechanism of the entire wheelchair is significantly reduced, and the overall appearance is compact and aesthetic. Referring to FIGS. 1 to 5, the rear wheel assembly 32 includes a second connecting member 321 and second wheel body 322 respectively mounted at both ends of the second connecting member 321. The first connecting member 31 is fixedly connected with the second connecting member 321. The second wheel body 322 rotates under the control of pushing and pulling the second connecting member 321 by the first connecting member 31, and the rear wheel assembly 32 is driven by the rotation of the second wheel body 322 to move closer to the front wheel assembly 4 during the folding process, saving a significant amount of labor. Further, the distance between the two sides of the second wheel body 322 is less than the distance between the sides of the first wheel body 42. When the rear wheel bracket 3 is folded until the second wheel body 322 and the first wheel body 42 overlap each other, the both sides of the second wheel body 322 are located between the both sides of the first wheel body 42, so that after the entire wheelchair is folded, all the structures are folded between the support members 41 on the left and right sides. The folded size is very small and it is convenient for storage. And when the folded wheelchair is moved, the first wheel body 42 and the second wheel body 322 can be driven to rotate at the same time by pushing the armrest 411, which facilitates the transportation and transfer of the folded wheelchair.

Furthermore, second limiting grooves 212 corresponding to the fourth connecting shaft 9 are respectively provided on both sides of the first limiting groove 211 at the bottom of the sitting portion 21. When the wheelchair is in the unfolded state, the fourth connecting shaft 9 is located in the second limiting groove 212, so that in the unfolded state, the second limiting groove 212 can provide a corresponding space for the fourth connecting shaft 9 for limitation, thereby ensuring the fourth connecting shaft 9 to operate smoothly and be completely covered. Therefore, the whole device has very few exposed mechanism, and the overall structure is compact and aesthetic.

In this embodiment, the first connecting shaft 5, the second connecting shaft 7, the third connecting shaft 8 and the fourth connecting shaft 9 are parallel to each other, which can effectively ensure that the rotation of the sitting portion 21 between the two supporting members 41 relative to the push rod 1 and the rotation of the rear wheel bracket 3 between the two support members 41 relative to the push rod 1 are smoother and more reliable.

Referring to FIGS. 1 to 5, the wheelchair according to this embodiment further includes a pedal mechanism 11. The pedal mechanism 11 is rotatably connected between the two support members 41, and is located at the bottom end of the support member 41. The pedal mechanism 11 includes a first support plate 111 between the two supporting members 41 and a second support plate 112 for placing the feet of the patient. The side edge of the second support plate 112 is rotatably connected to the side edge of the first support plate 111 through a fifth connecting shaft 114, and both ends of the first support plate 111 are respectively fixedly connected with the support member 41 through the third connecting member 113. When the wheelchair is folded, the second support plate 112 is rotated upward until being erected, and thus the pedal mechanism 11 is folded, which simplifies the structure and facilitates the operation.

In summary, the wheelchair of this embodiment has a simplified structural design, fewer exposed mechanisms, and a clean and aesthetic appearance, which greatly facilitates the folding operation, and saves the labor, thereby facilitating the senior person or the person with disabilities to use independently. The wheelchair is very compact after being folded, and is convenient for storage, and the user can push the first wheel body and the second wheel body for rotation through the armrest, so as to transfer and transport the folded wheel bodies with ease and convenience.

It should be understood that the terms "first" and "second" are used in the present disclosure to describe various information, but the information should not be limited to these terms, and these terms are merely used to distinguish the same type of information from each other. For example, without departing from the scope of the present disclosure, "first" information can also be referred to as "second" information, and similarly, "second" information can also be referred to as "first" information.

The above mentioned are the preferred embodiments of the present disclosure. It should be pointed out that for those skilled in the art, without departing from the principle of the present disclosure, several improvements and modifications can be made. These improvements and modifications are also regarded as the claimed scope of this disclosure.

What is claimed is:

1. A wheelchair structure, comprising a seat body, a rear wheel bracket, a push rod device, and two relatively-arranged front wheel assemblies, wherein each of the two relatively-arranged front wheel assemblies includes a support member and a first wheel body mounted at a bottom end of the support member, the seat body and the rear wheel bracket are rotatably connected between the support members of the two front wheel assemblies, the push rod device includes a push rod and a driving mechanism for driving the push rod to make a telescopic movement, a first end of the push rod is rotatably and vertically connected to a connecting shaft that is rotatably connected to a bottom of the seat body, a second end of the push rod is rotatably connected with the rear wheel bracket, the push rod is driven to make the telescopic movement to drive the seat body to rotate between the support members of the two front wheel assemblies so as to prop up or lower the seat body, a control switch is provided in an upper part of the support member, and the control switch is electrically connected with the driving mechanism.

2. A wheelchair structure, comprising a seat body, a rear wheel bracket, a push rod device, and two relatively-arranged front wheel assemblies, wherein each of the two relatively-arranged front wheel assemblies includes a support member and a first wheel body mounted at a bottom end of the support member, the seat body and the rear wheel bracket are rotatably connected between the support members of the two front wheel assemblies, the push rod device includes a push rod and a driving mechanism for driving the push rod to make a telescopic movement, a first end of the push rod is rotatably connected to a bottom of the seat body, a second end of the push rod is rotatably connected with the rear wheel bracket, the push rod is driven to make the telescopic movement to drive the seat body to rotate between the support members of the two front wheel assemblies so as to prop up or lower the seat body, a control switch is provided in an upper part of the support member, and the control switch is electrically connected with the driving mechanism, wherein the seat body includes a sitting portion, a limiting groove is provided at a bottom of the sitting portion, the rear wheel bracket includes a rear wheel assembly and a first connecting member, a bottom end of the first connecting member is fixedly connected with the rear wheel assembly, a top end of the first connecting member is connected between the two front wheel assemblies, and when the wheelchair structure is in an unfolded state, the top end of the first connecting member is located in the limiting groove.

3. The wheelchair structure according to claim 2, wherein the support member includes a support plate, an armrest of the wheelchair structure is formed in an upper part of the support plate, a through hole for fingers to pass through is provided to the armrest, and the control switch is arranged in the through hole.

4. The wheelchair structure according to claim 3, further comprising a handle, wherein the control switch is provided on the handle, the handle is rotatably connected to a front side of the through hole, and gripping the handle and lifting the handle upward is to activate the driving mechanism to one of extend or contract the push rod device.

5. The wheelchair structure according to claim 3, wherein a clamping slot is provided at a bottom end of the support plate, and the first wheel body is embedded in the clamping slot.

6. The wheelchair structure according to claim 2, wherein the sitting portion is rotatably connected between the support members of the two front wheel assemblies through a first connecting shaft, a first end of the push rod is rotatably connected to the bottom of the seat body at a position on a rear side of the first connecting shaft, and a second end of the push rod is rotatably connected with the first connecting member.

7. The wheelchair structure according to claim 6, wherein two connect receptors are provided in the limiting groove, relatively-arranged positioning holes are respectively provided on the two connect receptors, a second connecting shaft is rotatably connected between the positioning holes of the two connecting seats, and a first end of the push rod is vertically connected with a second connecting shaft.

8. The wheelchair structure according to claim 6, wherein a connecting groove with an opening toward the front side is provided on the first connecting member, a third connecting shaft is rotatably connected between two side walls of the connecting groove, the second end of the push rod is vertically connected with the third connecting shaft, two side walls of the upper end of the connecting groove are rotatably connected with their respective relative support members, and an end of the connecting groove is fixedly connected with the rear wheel bracket.

9. The wheelchair structure according to claim 8, wherein the two side walls of the upper end of the connecting groove are respectively connected with connecting plates arranged relatively with respect to the supporting members, a fourth connecting shaft is rotatably connected between the connecting plates and the supporting members arranged relatively with respect to the connecting plates, and when the wheelchair structure is in the unfolded state, the connecting plates are perpendicular to the sitting portion.

10. The wheelchair structure according to claim 2, wherein the rear wheel assembly includes a second connecting member and second wheel bodies rotatably connected to both ends of the second connecting member, and the bottom end of the first connecting member is vertically connected with the second connecting member.

* * * * *